F. E. SCHARTOW.
HAME CLIP.
APPLICATION FILED AUG. 26, 1912.

1,121,943.

Patented Dec. 22, 1914.

UNITED STATES PATENT OFFICE.

FRANK E. SCHARTOW, OF RACINE, WISCONSIN, ASSIGNOR OF ONE-HALF TO RUPERT A. NOURSE, OF MILWAUKEE, WISCONSIN.

HAME-CLIP.

1,121,943.

Specification of Letters Patent.

Patented Dec. 22, 1914.

Application filed August 26, 1912. Serial No. 717,041.

*To all whom it may concern:*

Be it known that I, FRANK E. SCHARTOW, a citizen of the United States, and resident of Racine, in the county of Racine and State of Wisconsin, have invented new and useful Improvements in Hame-Clips, of which the following is a description, reference being had to the accompanying drawings, which are a part of this specification.

This invention has for its object to provide a hame clip with a pivotal trace connection which will be simple in its construction, durable and efficient in use being free from the necessity for the presence of other parts than the two which form the pivotal connection.

With the above and other objects in view the invention consists in the hame clip as herein claimed and all equivalents.

Figure 1:
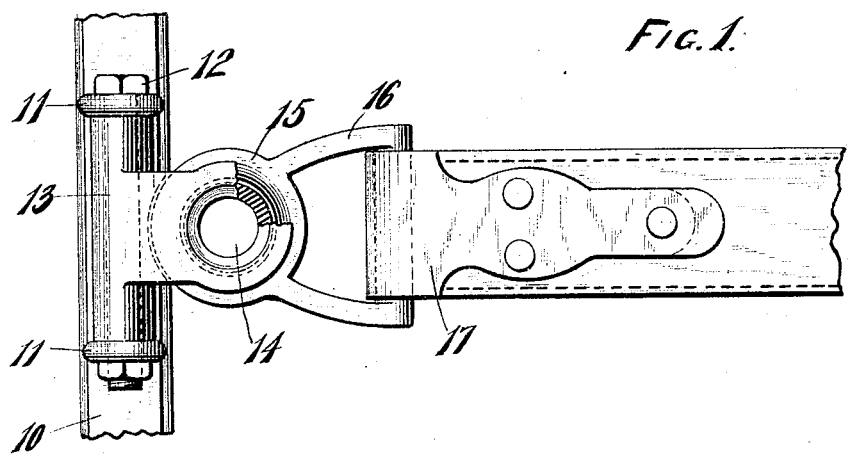
Figure 2:
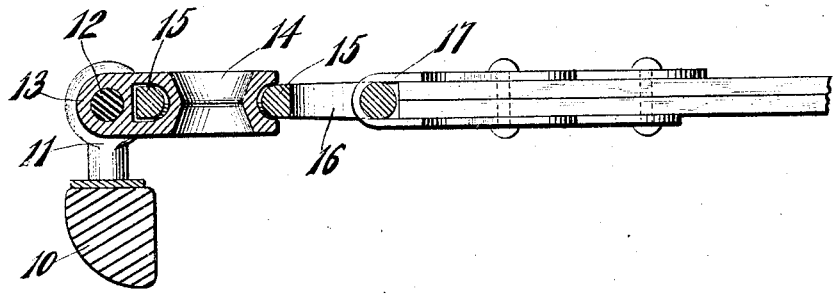

Referring to the accompanying drawings in which like characters of reference indicate the same parts in the different views: Figure 1 is a side view of a hame clip constructed in accordance with this invention, a portion of one member thereof being broken away to more clearly show the construction; and, Fig. 2 is a longitudinal sectional view thereof.

In these drawings 10 indicates the hame member having the usual eyes 11 projecting therefrom through which the bolt 12 passes to form a pivotal connection between them for the hame clip member 13 by having the tubular portion of the hame clip member loosely fitted thereon as usual. The hame clip member 13 has a central projection integral therewith which is in the form of an eye 14 with a central opening and a concentric annular bearing which forms a groove around the eye at the exposed edge thereof and is in the form of an opening passing between the member and the tubular part of the clip member at the unexposed portion. A ring member 15 fits in the annular bearing around the eye and is unbroken and has integrally formed with it a loop 16 fitting within the trace connection 17 as usual. The ring fitting within the annular bearing without the use of bent or upset parts and without the use of split parts may be produced by casting one within the other, that is to say the ring with its loop 16 may be cast within the clip member 13 while the latter is chilled or the clip member with its eye surrounded by the annular bearing may be cast within the ring while it is chilled.

The hame clip constructed in accordance with this invention affords a large pivotal bearing which is able to withstand the wear and the strain to which the device is subjected and is incapable of being forced apart as with bent and upset pivotal constructions because of the integral formation of the bearing member with the clip member through the two side connecting portions thereof which fit on opposite sides of the ring and because of the unbroken formation of the ring member.

What I claim as new and desire to secure by Letters Patent is:

1. A hame clip, comprising a clip member for connection with the hames, a loop adapted for connection with the traces, and a pivotal connection between the loop and the clip member comprising an unbroken ring on one and an annular bearing on the other, both of which are unbroken and integral with the said members, the said annular bearing having the ring fitting therein and completely surrounding a portion of the ring.

2. A hame clip, comprising a clip member for attachment to the hames, a loop adapted for attachment to the traces, an unbroken ring on the loop integral therewith, and an annular bearing on the clip integral therewith and fitting within the ring and against the sides thereof, said bearing having its connections with the clip at both sides of the ring.

3. A hame clip, comprising a clip member for attachment to the hames, a loop member adapted for connection with the traces, an unbroken ring on the loop member, and an integral projection on the clip member with an annular bearing formed therein by means of a groove at its exposed portion, and an opening at its unexposed portion, said ring fitting within the said annular bearing.

In testimony whereof, I affix my signature, in presence of two witnesses.

FRANK E. SCHARTOW.

Witnesses:
MARIE SCHATZ,
E. G. H. WENDT.

Copies of this patent may be obtained for five cents each, by addressing the "Commissioner of Patents, Washington, D. C."